(12) United States Patent
Nakagomi et al.

(10) Patent No.: US 7,639,816 B2
(45) Date of Patent: Dec. 29, 2009

(54) MOBILE COMMUNICATION TERMINAL DEVICE AND SERVER DEVICE

(75) Inventors: Hisashi Nakagomi, Yokohama (JP); Tadao Takami, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 729 days.

(21) Appl. No.: 10/098,575

(22) Filed: Mar. 18, 2002

(65) Prior Publication Data

US 2002/0172365 A1 Nov. 21, 2002

(30) Foreign Application Priority Data

Mar. 19, 2001 (JP) .................... P2001-078683

(51) Int. Cl.
*H04K 1/00* (2006.01)
(52) U.S. Cl. .................... 380/270; 726/14; 713/166
(58) Field of Classification Search ............. 380/270, 380/200, 201, 255, 277; 713/200, 201, 1, 713/2, 188, 194, 166; 176/2; 726/2, 14
See application file for complete search history.

(56) References Cited

U.S. PATENT DOCUMENTS

| | | | | |
|---|---|---|---|---|
| 5,126,728 | A * | 6/1992 | Hall | 726/30 |
| 5,757,271 | A * | 5/1998 | Andrews | 340/568.1 |
| 5,958,005 | A * | 9/1999 | Thorne et al. | 709/202 |
| 5,963,864 | A * | 10/1999 | O'Neil et al. | 455/445 |
| 6,070,245 | A * | 5/2000 | Murphy et al. | 726/3 |
| 6,208,376 | B1 * | 3/2001 | Tanaka et al. | 348/153 |
| 6,292,900 | B1 * | 9/2001 | Ngo et al. | 726/6 |
| 6,356,192 | B1 * | 3/2002 | Menard et al. | 340/539.19 |
| 6,434,125 | B1 * | 8/2002 | Marks et al. | 370/328 |
| 6,496,930 | B1 * | 12/2002 | Ono et al. | 713/168 |
| 6,510,349 | B1 * | 1/2003 | Schneck et al. | 700/9 |
| 6,928,166 | B2 * | 8/2005 | Yoshizawa | 380/247 |
| 6,990,591 | B1 * | 1/2006 | Pearson | 726/22 |
| 7,149,896 | B1 * | 12/2006 | Bahl et al. | 713/166 |
| 7,493,653 | B2 * | 2/2009 | Klein | 726/3 |
| 2001/0055283 | A1 * | 12/2001 | Beach | 370/328 |
| 2002/0109580 | A1 * | 8/2002 | Shreve et al. | 340/5.61 |

FOREIGN PATENT DOCUMENTS

| | | |
|---|---|---|
| DE | 198 12 215 | 9/1999 |
| EP | 0 779 760 | 6/1997 |
| JP | 6-244833 | 9/1994 |
| JP | 9-116534 | 5/1997 |
| JP | 2003-501891 | 1/2003 |
| WO | WO 00/74345 | 12/2000 |
| WO | WO 01/08435 | 2/2001 |

* cited by examiner

*Primary Examiner*—Kimyen Vu
*Assistant Examiner*—Joseph Pan
(74) *Attorney, Agent, or Firm*—Oblon, Spivak, McClelland, Maier & Neustadt, L.L.P.

(57) ABSTRACT

The mobile communication terminal device has a security communication function, and includes a detection unit for detecting the security level of the destination of connection, and an announcing unit for announcing the detected security level. The user is able to confirm whether security is ensured at the connectee.

10 Claims, 8 Drawing Sheets

Fig.10 ically employed between the portable communication terminal device and communication system for confirming the validity of the person or the terminal at the other end of the line. Moreover, in order to encode signals transmitted and received between the portable communication terminal device and communication system, a communication procedure referred to as ciphering is also concurrently employed. Pursuant to these communication procedures, the mobile communication terminal device and communication system are able to mutually guarantee the validity of the opponent, and, simultaneously, the confidentiality of the transmitted and received signal is retained. This prevents an individual from trying to pass oneself as the caller or receiver in order to alter or scope data. Security of the communication and communication system is ensured thereby.

MOBILE COMMUNICATION TERMINAL DEVICE AND SERVER DEVICE

BACKGROUND OF THE INVENTION

1. Field of the Invention

The present invention relates to a mobile communication terminal device and server device having a security communication function.

2. Description of the Related Art

Conventionally, in a wireless communication system, a communication procedure referred to as authentication has been employed between the portable communication terminal device and communication system for confirming the validity of the person or the terminal at the other end of the line. Moreover, in order to encode signals transmitted and received between the portable communication terminal device and communication system, a communication procedure referred to as ciphering is also concurrently employed. Pursuant to these communication procedures, the mobile communication terminal device and communication system are able to mutually guarantee the validity of the opponent, and, simultaneously, the confidentiality of the transmitted and received signal is retained. This prevents an individual from trying to pass oneself as the caller or receiver in order to alter or scope data. Security of the communication and communication system is ensured thereby.

In an analog wireless communication system, it was necessary to change the analog wireless modulation method for ensuring the security described above. Thus, a circuit for changing the modulation method had to be added to or installed in the modulation and demodulation circuit of the communication system and mobile communication terminal device. As a result, the communication system cost would increase, and power consumption would increase pursuant to the additional circuit of the mobile communication terminal device, thereby causing significant decrease in portability. Further, there is an additional problem in that the communication signal quality cannot be maintained easily due to the increase in the operational process of analog signals of the added circuit.

Thereafter, in digital wireless communication, authentication and ciphering with digital signal processing have been proposed and it has became easy to ensure security. Nevertheless, when connecting a mobile communication terminal device and a communication system operating on the digital system, there is a premise of the ensurement of such security based on the aforementioned authentication and ciphering. In a wireless mobile communication method, regarding a delay in the connection of a call, it is not desirable that the design requires a long time to connect the call in comparison to a wired telephone connection from the perspective of service. Moreover, in data communication, it is also preferable that the connection delay be kept to a minimum even for interactive uses such as upon using the web browsing. Based on such demands, in the connection of a mobile communication terminal device and a communication system, the design is such that the time required from the start of connection to authentication and ciphering is kept to a minimum.

Figure 10:
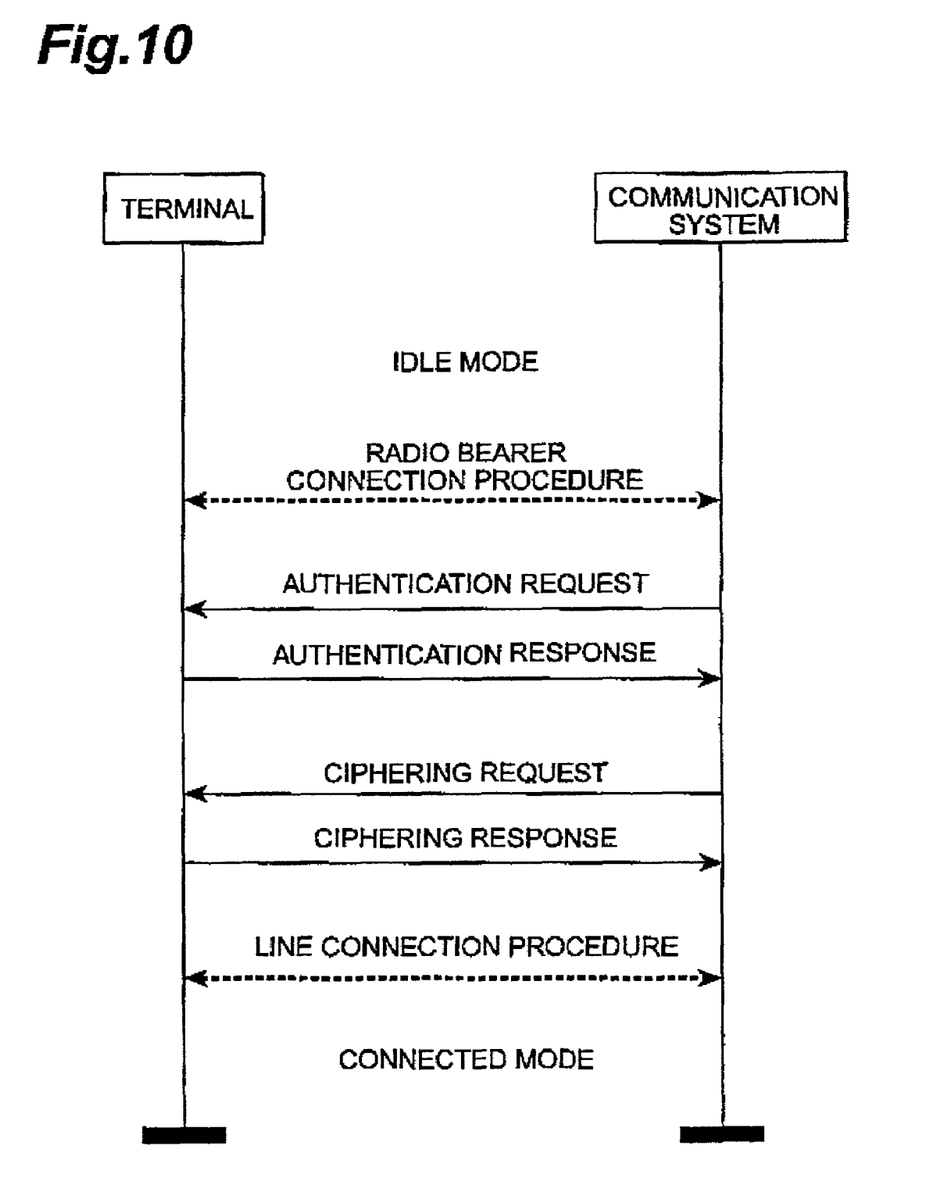
FIG. 10 is a diagram illustrating the communication order of the authentication and ciphering currently employed in the connection between a mobile communication system and mobile communication terminal device.

FIG. 10 is a diagram illustrating an example of the communication procedure of the authentication and ciphering conventionally employed upon connecting a mobile communication system and mobile communication terminal device. As shown in FIG. 10, after the radio bearer connection procedure is started from the stand-by mode, an authentication request is made from the communication system to the mobile communication terminal device. The mobile communication terminal device makes an authentication response to the communication system upon receiving the authentication request. Next, the communication system makes a ciphering request to the mobile communication terminal device, and the mobile communication terminal device makes a ciphering response thereto. Then, the line connection procedure is commenced, and the routine proceeds to the connected state. As described above, the design is such that the authentication and ciphering are completed with the transmission and reception of a few signals. Therefore, the user is able to immediately make communication without having to recognize the contents or situation of the communication procedure of authentication and ciphering upon receiving or making a call.

SUMMARY OF THE INVENTION

In the future, it is anticipated that the transmission speed will become faster, and, in addition to conventional voice communication and data communication, electronic commerce and distribution services of pay contents information will be realized with a mobile communication terminal device. With this type of diversified communication, the following types of security are required:

Provision of conventional security between the mobile communication terminal device and communication system; and Provision of end-to-end security from the mobile communication terminal device to the person or the terminal on the other end of the line connected via the Internet, with respect to transaction information or the like with financial institutions and credit card companies.

In order to simultaneously satisfy the above, the communication system and mobile communication terminal device may be equipped with hardware and software based on the most powerful security technology to date. Nonetheless, with security having sophisticated functions and strength, the operational processing in the authentication and ciphering will increase, which will result in the increase of connection delay. Further, the increase in the encoding processing load of transmission data will put pressure on the processing performance of the communication system, thereby causing the increase in the power consumption of the mobile communication terminal.

Thus, it is demanded that the security be suitably selected as a trade off against the transmission speed of communication, communication of the opponent (depending on the security performance of the opponent; for example, the server of the opponent connected a telephone or communication system), function and strength (security level) of security suitable for the type of communication, and processing time and load of the security procedure.

Moreover, when the provision of security is not made under a specific condition (applicable condition of the area, country or load reduction of communication system; simplification of mobile communication terminal in order to seek the reduction in power consumption, etc.), it is anticipated that the security will not be provided in some cases. Accordingly, the security level in a mobile communication terminal device and mobile wireless communication system will diversify as described above.

The present invention was devised in view of the foregoing problems, and an object thereof is to provide a mobile communication terminal device and server device enabling the selection or connection/disconnection in accordance with the security level of the connectee (the other end of the line).

In order to achieve the foregoing object, the present invention is a mobile communication terminal device having a security communication function, comprising: a detection unit for detecting the security level of the connectee; and a announcing unit for announcing the detected security level.

Since the security level of the connectee is detected and such detected security level is announced upon conducting communication, the user is able to confirm whether security is ensured at the connectee. Here, communication includes, in addition to standard communication such as voice communication and data communication, control communication for notifying positional information of a mobile communication terminal device.

It is preferable that the mobile communication terminal device of the present invention further comprises a judgment unit for judging whether the detected security level satisfies a prescribed condition, and wherein the announcing unit announces the results of the judgment.

As described above, since judgment is made on whether the detected security level satisfies a prescribed condition, the user is able to select whether to continue or discontinue communication in accordance with the judgment result.

Further, in this case, it is preferable that the mobile communication terminal device further comprises a security level setting unit for setting at least one of a security level permitting communication or a security level not permitting communication.

Pursuant to this structure, the user may freely set the necessary security level.

Moreover, in this case, it is preferable to further comprise a control unit for discontinuing communication when the detected security level has not reached the security level permitting communication or falls below the security level not permitting communication.

As described above, when the detected security level has not reached a security level permitting communication, or falls below a security level not permitting communication, the communication is discontinued. Thereby, if the user is not satisfied with the security condition the user set, communication can be automatically discontinued, and troubles relating to security may be forestalled.

Further, when comprising the foregoing security level setting unit, it is preferable that the announcing unit urges the selection of continuance or discontinuance of communication when the detected security level has not reached the security level permitting communication or falls below the security level not permitting communication.

As described above, when the detected security level has not reached the security level permitting communication or falls below the security level not permitting communication, the selection of continuance or discontinuance of communication is urged. Thereby, the user is able to select whether to continue or discontinue communication when the detected security level does not satisfy the set condition.

Moreover, it is preferable that the mobile communication terminal device of the present invention further comprises a notification unit for notifying the caller of the discontinuance of communication when communication is discontinued based on the security level detected at the time of call reception.

As described above, notification is made to the caller of the discontinuance of communication when communication is discontinued based on the security level detected at the time of call reception. It is thereby possible to notify the caller of the discontinuance of communication.

The server device according to the present invention is a server device for communicating with a mobile communication terminal device via a communication network, comprising: a server side detection unit for detecting the security level of the connectee; and a security level setting unit for setting at least one of a security level permitting communication or a security level not permitting communication.

Pursuant to this structure, the user may freely set the necessary security level.

Further, it is preferable that the server device of the present invention further comprises a server side control unit for discontinuing communication when the detected security level has not reached the security level permitting communication or falls below the security level not permitting communication.

As described above, when the detected security level has not reached a security level permitting communication, or falls below a security level not permitting communication, the communication is discontinued. Thereby, if the user is not satisfied with the security condition the user set, communication can be automatically discontinued, and troubles relating to security may be forestalled.

Moreover, it is preferable that the server device according of the present invention further comprises an inquiry unit for making an inquiry to the mobile communication terminal device to select either the continuance or discontinuance of communication when the detected security level has not reached the security level permitting communication or falls below the security level not permitting communication; and a server side control unit for continuing or discontinuing communication in accordance with the response to the inquiry.

As described above, when the detected security level has not reached the security level permitting communication or falls below the security level not permitting communication, an inquiry is made to the mobile communication terminal device to select either the continuance or discontinuance of communication, and communication is continued or discontinued in accordance with the response to such inquiry. Thereby, the user is able to select the continuance or discontinuance of communication when the detected security level does not satisfy the set condition.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention may be more readily described with reference to the accompanying drawings, in which.

DESCRIPTION OF THE PREFERRED EMBODIMENTS

The optimum embodiments of the present invention are now explained with reference to the accompanying drawings.

Figure 1:
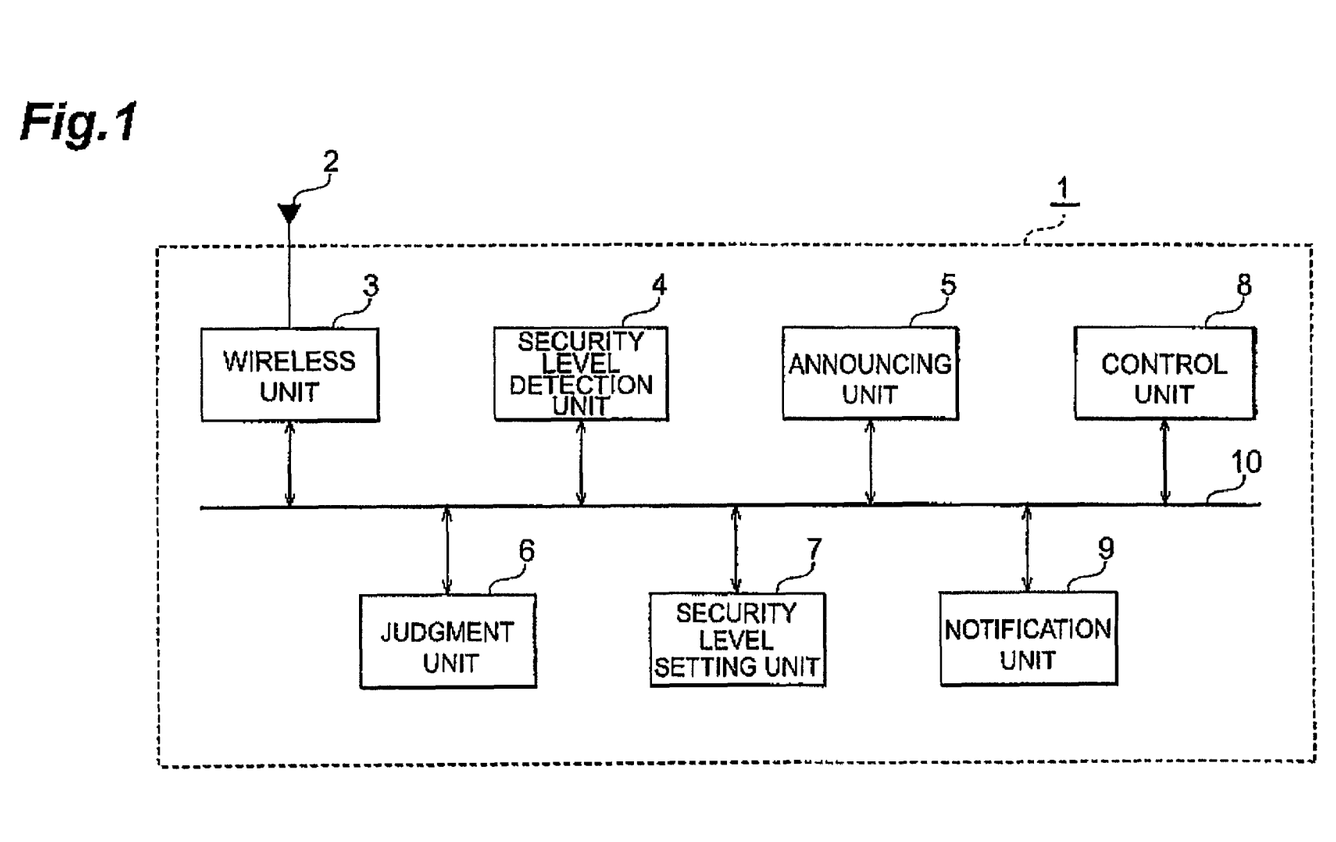
FIG. 1 is a block diagram illustrating the schematic structure of the mobile communication terminal device according to an embodiment of the present invention.

FIG. 1 is a block diagram illustrating the schematic structure of the mobile communication terminal device of the present embodiment. A mobile communication terminal device 1 has a security communication function, and conducts wireless communication with a wireless unit 3 comprising an antenna 2. A security level detection unit 4 detects the security level of the connectee, and an announcing unit 5 announces the detected security level to the user. This announcing, for example, may be made by displaying a graph of the security level on a liquid crystal display not shown or by outputting sound data. Further, the security level may be an indicator of a type of the security.

A judgment unit 6 judges whether the security level detected with the security level detection unit 4 satisfies a prescribed condition. As a prescribed condition, for instance, there is a security level set by the user via a security level setting unit 7 described later, or a predetermined security level. The announcing unit 5 announces the result of such the result detected by a security level detection unit 4 to the user. The user is thereby able to recognize which security is used upon communication.

The security level setting unit 7 sets at least one of a security level permitting communication when the detected security level is not less than the value thereof, or a security level not permitting communication when the detected security level is less than the value thereof. The user is thereby able to freely set the necessary security level at his/her judgment. A control unit 8 discontinues communication when the detected security level has not reached a security level permitting communication, or falls below a security level not permitting communication. It is thereby possible to avoid communication which is likely to cause trouble. A notification unit 9 notifies the discontinuance of communication to the caller when communication is discontinued based on the security level detected at the time of call reception. Each of the aforementioned structural elements is mutually connected to a control bus 10.

Moreover, the announcing unit 5 may also urge the user to select either the continuance or discontinuance of communication when the detected security level has not reached a security level permitting communication, or falls below a security level not permitting communication.

Figure 2:
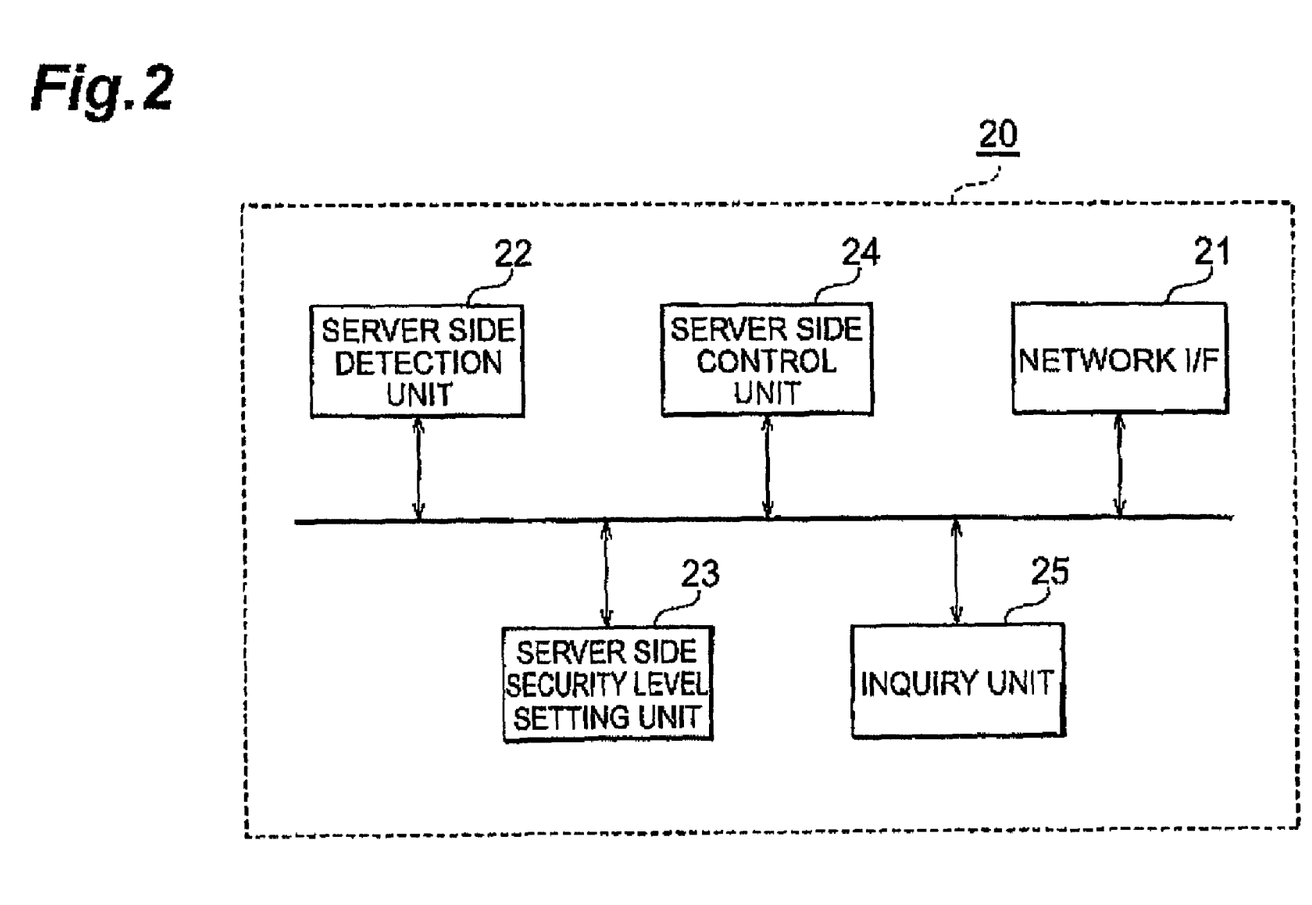
FIG. 2 is a diagram illustrating the schematic structure of the server device according to an embodiment of the present invention.

FIG. 2 is a diagram illustrating the schematic structure of the server device of the present embodiment. A server device 20 is connected to a communication network via a network interface 21, and conducts communication with a mobile communication terminal device via a switching center and base station not shown. A server side detection unit 22 detects the security level of communication with the mobile communication terminal device, and a server side security level setting unit 23 sets at least one of a security level permitting communication or a security level not permitting communication based on the user's instructions. A server side control unit 24 discontinues communication when the security level detected by the server side detection unit 22 has not reached a security level permitting communication, or falls below a security level not permitting communication. It is thereby possible to avoid communication likely to cause trouble.

An inquiry unit 25 makes an inquiry to the mobile communication terminal device to select either the continuance or discontinuance of communication when the security level detected with the server side detection unit 22 has not reached the security level permitting communication or falls below the security level not permitting communication, and the server side control unit 24 continues or discontinues communication in accordance with the response to the inquiry.

Figure 3:
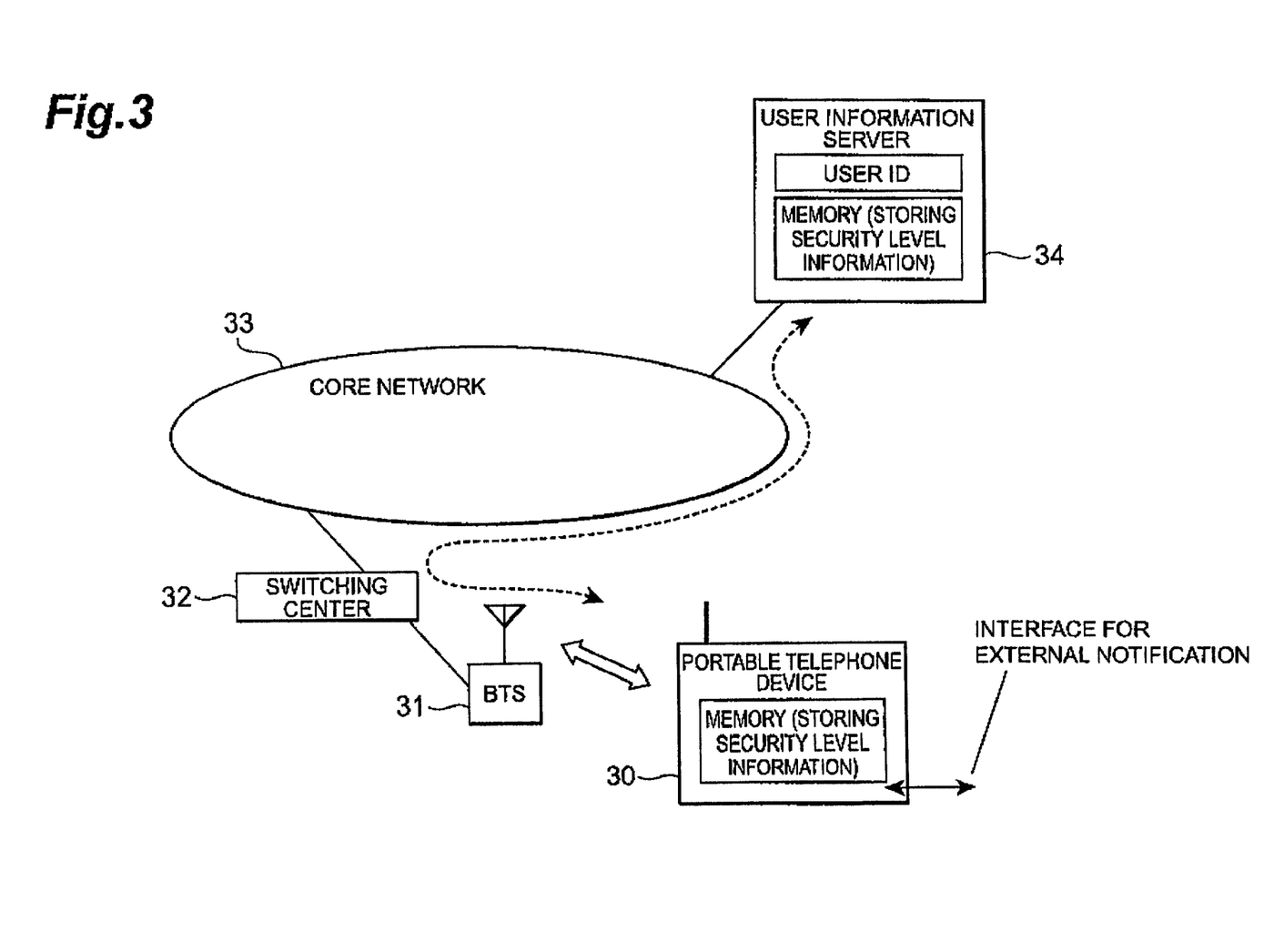
FIG. 3 is a diagram illustrating the outline of the communication system according to an embodiment of the present invention.

FIG. 3 is a diagram illustrating the outline of the communication system of the present embodiment. A portable telephone device 30 as the mobile communication terminal device adopts the basic structure depicted in FIG. 1, and further comprises an internal memory storing security information, and an external communication interface. The portable telephone device 30 conducts wireless transmission and reception of signals with the base station 31. Signals transmitted by the portable telephone device 30 are received by the base station 31, and forwarded to the user information server 34 as the server device connected to a core network 33 via a switching center 32. The user information server 34 adopts the basic structure as depicted in FIG. 2, and further comprises an internal memory storing security information, and user ID. Signals transmitted by the user information server 34 are forwarded to the portable telephone device 30 in an opposite flow.

Figure 4:
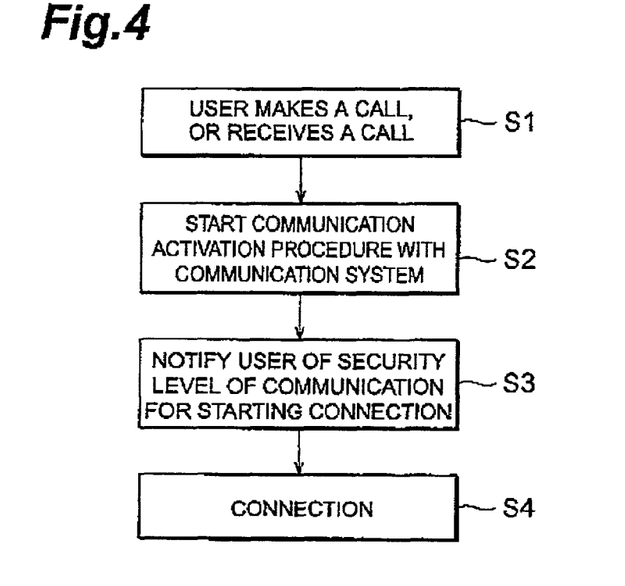
FIG. 4 is a flowchart illustrating the operation of the mobile communication terminal device.

Next, the operation of a communication system of the present embodiment structured as described above is explained. FIG. 4 is a flowchart illustrating the operation of the mobile communication terminal device. When the portable communication terminal device receives a call, or when the portable communication terminal device makes a call (step S1), the portable communication terminal device and communication system commence a communication activation procedure (step S2). Next, the security level of such communication or communication sys ten is detected, and information thereof is exchanged and notified to the user (step S3). Communication is thereafter established (step S4). Here, as a method of notifying the user, a liquid crystal display, or illumination, flashing or color-change of light-emitting elements may be made, for example, on the screen of the mobile communication terminal device as the external communication interface depicted in FIG. 3. Moreover, notification may also be made through a sound talkie, vibration, and so on. Here, adopted may also be a mode of avoiding the direct notification to the user by suspending the notification to the portable communication terminal device.

As described above, since the security level of the destination of connection is detected and such detected security level is announced upon conducting communication, the user is able to confirm whether security is ensured at the destination of connection.

Figure 5:
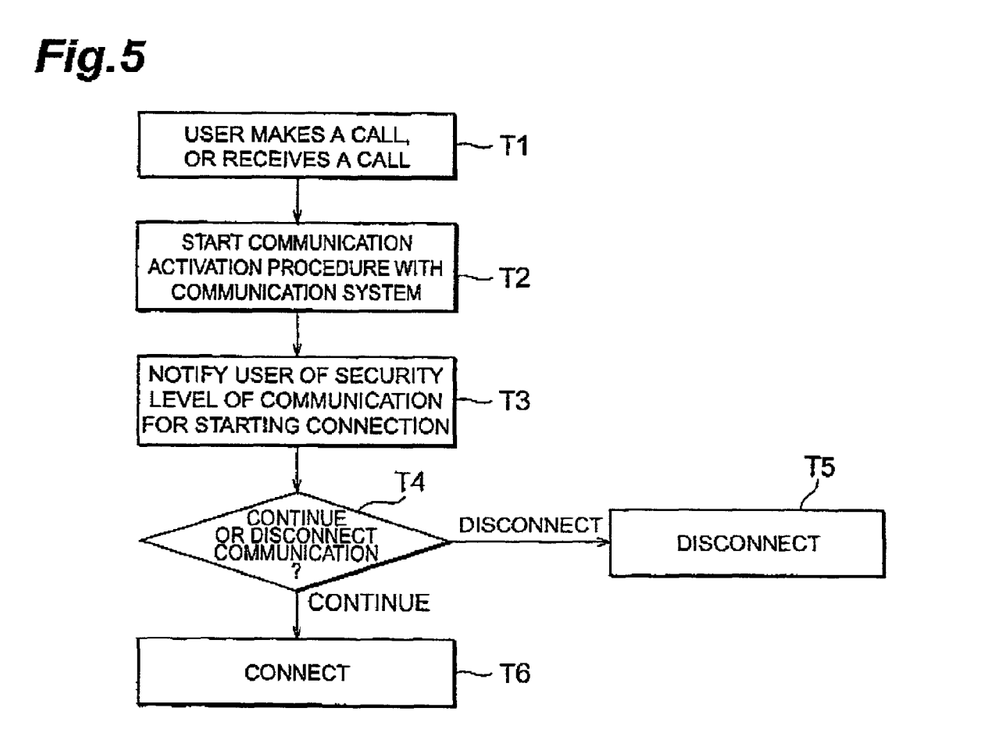
FIG. 5 is a flowchart illustrating another operation of the mobile communication terminal device.

FIG. 5 is a flowchart illustrating another operation of the portable communication terminal device. When the portable communication terminal device receives a call, or when the portable communication terminal device makes a call (step T1), the portable communication terminal device and communication system commence a communication activation procedure (step T2). Next, the security level of such communication or communication system is detected, and information thereof is exchanged and notified to the user (step T3). The user recognizes such notification via the external notification interface or the like and selects whether to continue or disconnect communication (step T4). Communication is ended when disconnection is selected (step T5), and communication is established when continuance is selected (step T6).

As described above, since judgment is made on whether the detected security level satisfies a prescribed condition, the user is able to select whether to continue or discontinue communication in accordance with the judgment result.

Figure 6:
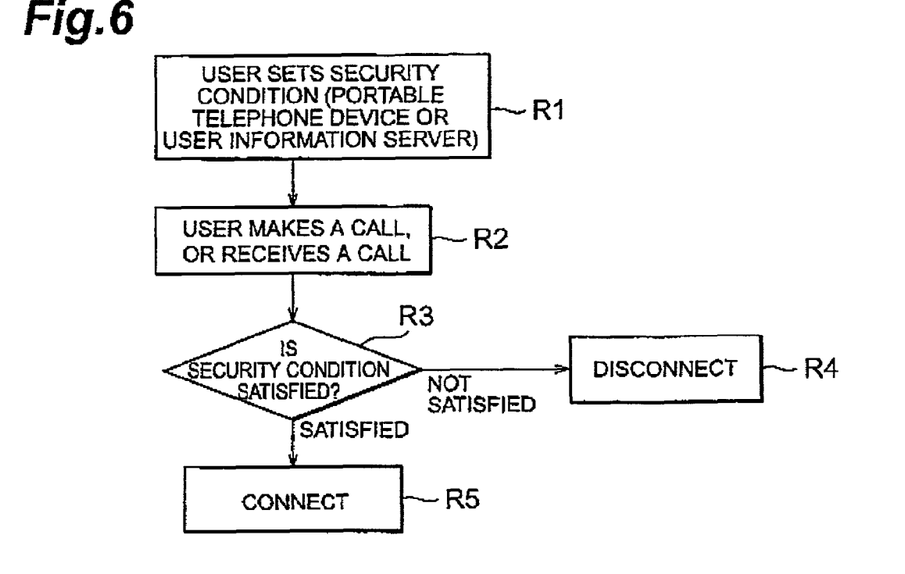
FIG. 6 is a flowchart illustrating another operation of the mobile communication terminal device.

FIG. 6 is a flowchart illustrating another operation of the portable communication terminal device. The user sets a security condition beforehand in an internal memory storing security level information within the portable communication terminal device, or in an internal memory storing securing information in a user information server within the communication system (step R1). Here, it is possible to select at least one of a security level permitting communication or a security level not permitting communication. When the portable communication terminal device receives a call, or when the portable communication terminal device makes a call (step R2), the portable communication terminal device and communication system commence a communication activation procedure. Next, the detected security level is compared with the security level condition previously set by the user (step R3), and communication is disconnected when such condition is not satisfied (step R4). Contrarily, communication is established when such condition is satisfied (step R5).

As described above, when the detected security level has not reached a security level permitting communication, or falls below a security level not permitting communication, the communication is discontinued. Thereby, if the user is not satisfied with the security condition the user set, communication can be automatically discontinued, and troubles relating to security may be forestalled.

Figure 7:
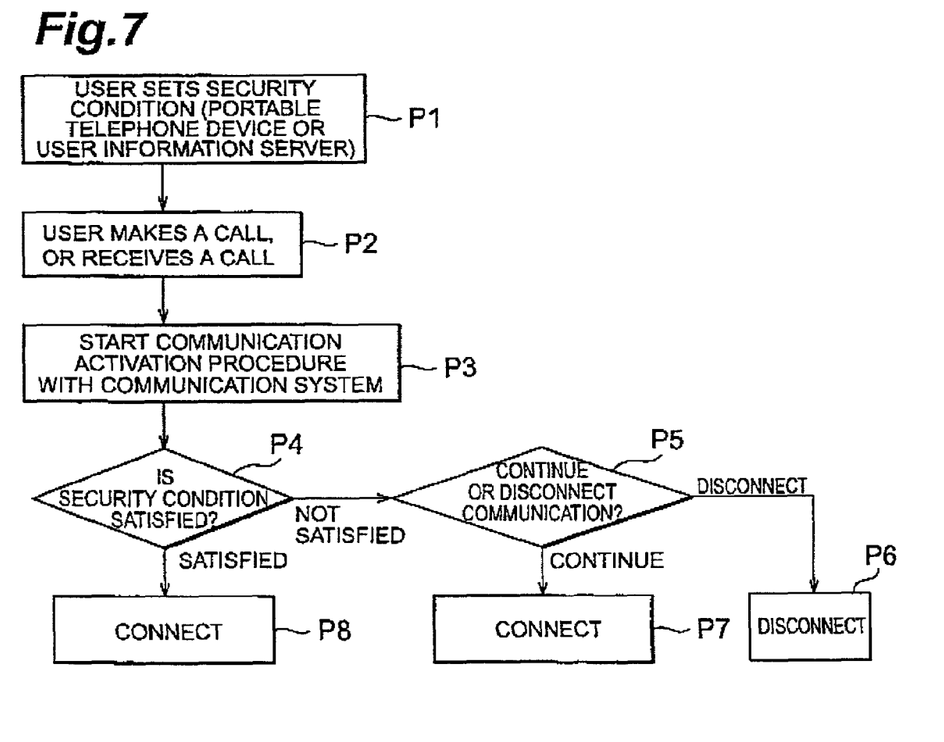
FIG. 7 is a flowchart illustrating another operation of the mobile communication terminal device.

FIG. 7 is a flowchart illustrating another operation of the mobile communication terminal device. The user sets a security condition beforehand in an internal memory storing security level information within the portable communication terminal device, or in an internal memory storing securing information in a user information server within the communication system (step P1). Here, it is possible to select at least one of a security level permitting communication or a security level not permitting communication. When the portable communication terminal device receives a call, or when the portable communication terminal device makes a call (step P2), the portable communication terminal device and communication system commence a communication activation procedure (step P3). Next, the detected security level is compared with the security level condition previously set by the user (step P4), and, when such condition is not satisfied, the user is urged to select the continuance or disconnection of communication, and judgment is made on which selection has been made (step P5). Communication is disconnected when disconnection is selected (step P6), and communication is established when continuance is selected (step P7). Meanwhile, communication is established when the security condition is satisfied at step P4 (step P8).

As described above, when the detected security level has not reached the security level permitting communication or falls below the security level not permitting communication, the selection continuance or discontinuance of communication is urged. Thereby, the user is able to select whether to continue or discontinue communication when the detected security level does not satisfy the set condition.

Figure 8:
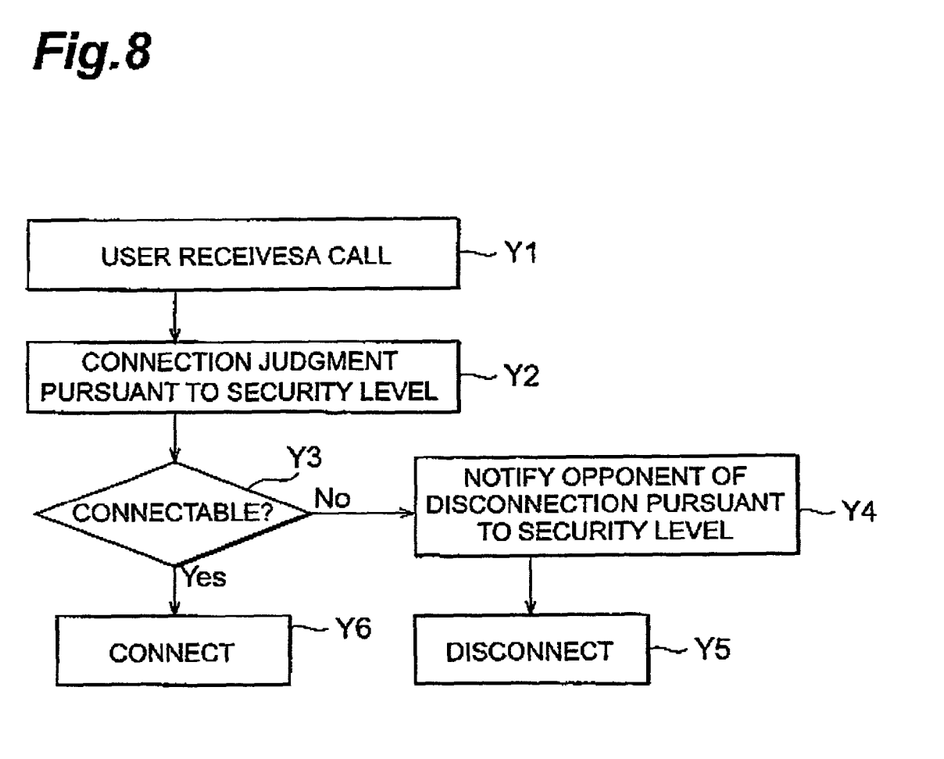
FIG. 8 is a flowchart illustrating another operation of the mobile communication terminal device.

FIG. 8 is a flowchart illustrating another operation of the mobile communication terminal device. When the mobile communication terminal device receives a call from the person or the terminal on the other end of the line (step Y1), the portable communication terminal and communication system commence a communication activation procedure. Next, a connection judgment is made pursuant to the security of such communication or communication system (step Y2), and judged is whether connection is possible (step Y3). When not connectable, the opponent is notified of the discontinuance of connection due to the security level (step Y4), and communication is disconnected (step Y5). Meanwhile, when connectable at step Y3, communication is established (step Y6).

As described above, notification is made to the caller of the discontinuance of communication when communication is discontinued based on the security level detected at the time of call reception. It is thereby possible to notify the caller of the discontinuance of communication.

Figure 9:
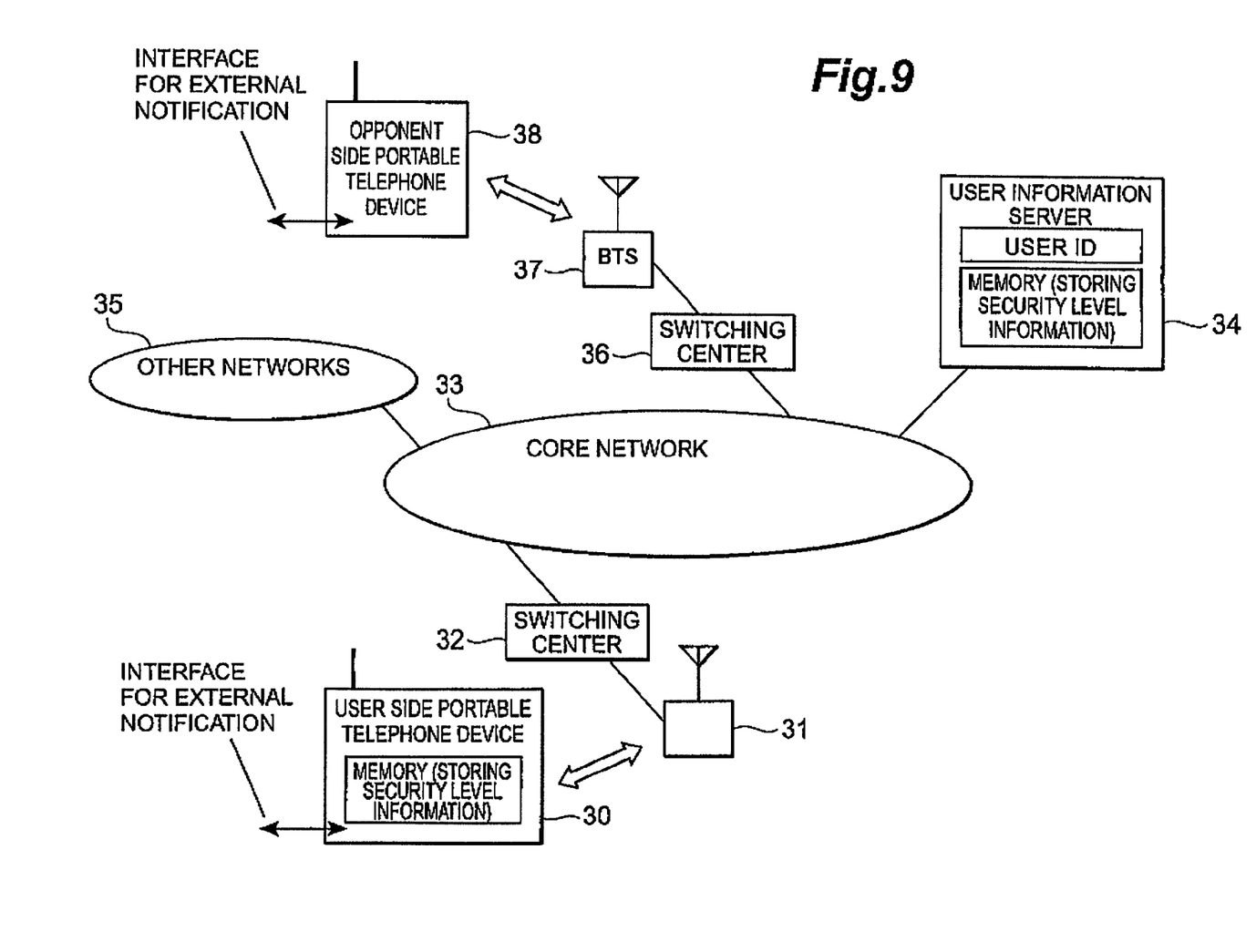
FIG. 9 is a diagram illustrating a modified example of the communication system according to the present invention.

FIG. 9 is a diagram illustrating a modified example of the communication system of the present embodiment. In this example, in addition to the communication system depicted in FIG. 3, another network 35 is connected to the core network 33, and a base station 37 is connected to the core network 33 via the switching center 36. The base station 37 conducts wireless communication with the opponent side communication terminal device 38. In this example, the user is able to confirm the security of the path from the user's portable telephone device 30 to the opponent side communication terminal device 38 connected thereto. Moreover, as a method for the user to confirm the security level or to notify the opponent, a sound talkie or a screen display on the mobile communication terminal device, among other methods, may be employed in the case of a voice communication. Further, in the case of data communication, an AT command, screen display on the mobile communication terminal device, alarm indication on the application conducting communication, among other methods, may be employed. In addition, in a communication without human intervention; for instance, in a communication between the mobile communication terminal device established in a vending machine or the like and a host computer, since a person is not able to make direct confirmation, the software conducting such communication may make the confirmation, or an alarm may be recorded.

In the foregoing explanation, as information to be used by the user for confirming the security level, the method of providing security; for example, only ciphering, only authentication, difference in code strength and so on may be considered. Table 1 below depicts an example of the notification method. In Table 1, "UE" means User Equipment (mobile communication terminal device). "NW" means Network, and the meaning of "communication system" and "communication" is included therein.

TABLE 1

| UE operation and display in network without security | When making a call | When receiving a call | NW talkie to caller |
|---|---|---|---|
| Selection by user | After inputting the telephone number, confirmed is whether to call | Dialog is displayed at the time of call reception, and confirmed is | Notification of discontinuance of communication by user |

TABLE 1-continued

| UE operation and display in network without security | When making a call | When receiving a call | NW talkie to caller |
|---|---|---|---|
|  | such number with a dialog while the receiver is off-hook | whether to accept the call |  |
| No selection by user | Invalid call "NW without security" | Invalid reception "NW without security" | Disconnect User denied |

As described above, according to the present embodiment, since the user is able to confirm the security level of the communication or communication system attempting connection, such user may select whether to make the connection, and a standard security is ensured thereby.

As explained above, the mobile communication terminal device according to the present invention is a mobile communication terminal device having a security communication function, and employs a structure of comprising a detection unit for detecting the security level of the destination of connection, and a announcing unit for announcing the detected security level.

As described above, since the security level of the destination of connection is detected and such detected security level is announced upon conducting communication, the user is able to confirm whether security is ensured at the destination of connection.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A mobile communication terminal device configured to perform encrypted communication with a communication system over a wireless connection, comprising:
    a detection unit configured to establish a communication activation procedure with the communication system, and configured to detect a security level that is used during the communication activation procedure with the communication system;
    an announcing unit configured to inform a user of the mobile communication terminal device about a strength of encryption of the detected security level from the communication activation procedure;
    a user interface operable by the user, configured to allow the user accept an incoming communication from the communication system, or is configured to allow the user to terminate the communication with the communication system, based on the detected security level;
    a data security setting unit allowing the user to set and store a reference security level for the mobile communication terminal device; and
    a comparison unit configured to compare the reference security level with the detected security level, and to either establish a communication with the communication system or accept an incoming communication from the communication system, if the reference security level is met,
    wherein the announcing unit is further configured to inform the user during the communication that has been established by said comparison unit that an actual security level of the communication has dropped below the reference security level.

2. The mobile communication terminal device according to claim 1, further comprising:
    a data security setting unit allowing the user to set and store a threshold security level for the mobile communication terminal device; and
    a comparison unit configured to compare the threshold security level with the detected security level, and to deny a communication with the communication system, if the threshold security level is not met.

3. The mobile communication terminal device according to claim 1,
    wherein the announcing unit is further configured to request the user whether the communication should be established or terminated, if the reference security level is not met.

4. The mobile communication terminal device according to claim 1,
    wherein said wireless connection includes a connection over more than one network to a base station, and
    wherein the detection unit is further configured to detect a security level of an entire path from the mobile communication terminal device to the base station over the more than one network.

5. A method of encrypted communication between a mobile communication terminal device and a communication system over a wireless connection, the method comprising:
    establishing a communication activation procedure with the communication system by the terminal device;
    detecting at the terminal device a security level that is used during the communication activation procedure with the communication system;
    informing a user of the terminal device about a strength of encryption of the detected security level from the communication activation procedure;
    operating a user interface of the terminal device by a user to accept an incoming communication from the communication system, or to terminate the communication with the communication system, based on the detected security level;
    setting and storing at the terminal device a reference security level for the terminal device;
    comparing the reference security level with the detected security level at the terminal device;
    establishing a communication with the communication system or accepting an incoming communication from the communication system, if the reference security level is met based on said comparing; and
    informing the user of the terminal device during the communication that has been established by said step of establishing that an actual security level of the communication has dropped below the reference security level.

6. The method of encrypted communication according to claim 5, further comprising:
    setting and storing at the terminal device a threshold security level for the mobile communication terminal device;
    comparing the threshold security level with the detected security level at the terminal device; and denying a communication with the communication system, if the threshold security level is not met based on said comparing.

7. The method of encrypted communication according to claim 5, further comprising:
   requesting the user of the terminal device whether the communication should be established or terminated, if the reference security level is not met.

8. The method of encrypted communication according to claim 5, wherein said wireless connection includes a connection over more than one network to a base station, said method further comprising:
   detecting a security level of an entire path from the terminal device to the base station over the more than one network.

9. The mobile communication terminal device according to claim 1,
wherein the announcing unit is further configured to request the user whether the communication that has been established by said comparison unit should be terminated, after it has been determined that the actual security level of the communication has dropped below the reference security level.

10. The method of encrypted communication according to claim 5, further comprising:
   requesting the user of the terminal device whether the communication that has been established by said step of establishing should be terminated, after said step of informing has informed the user that the actual security level of the communication has dropped below the reference security level.

* * * * *